UNITED STATES PATENT OFFICE.

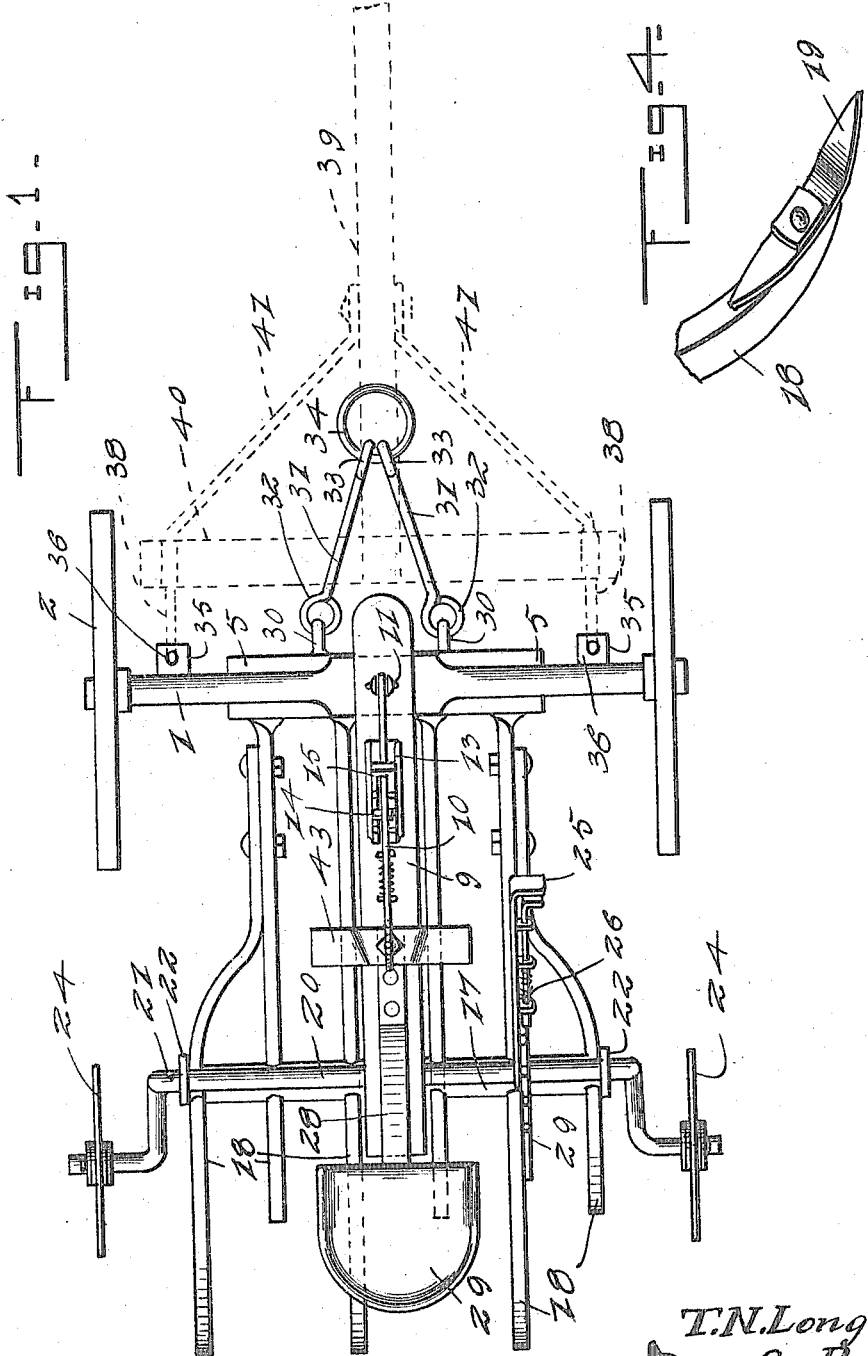

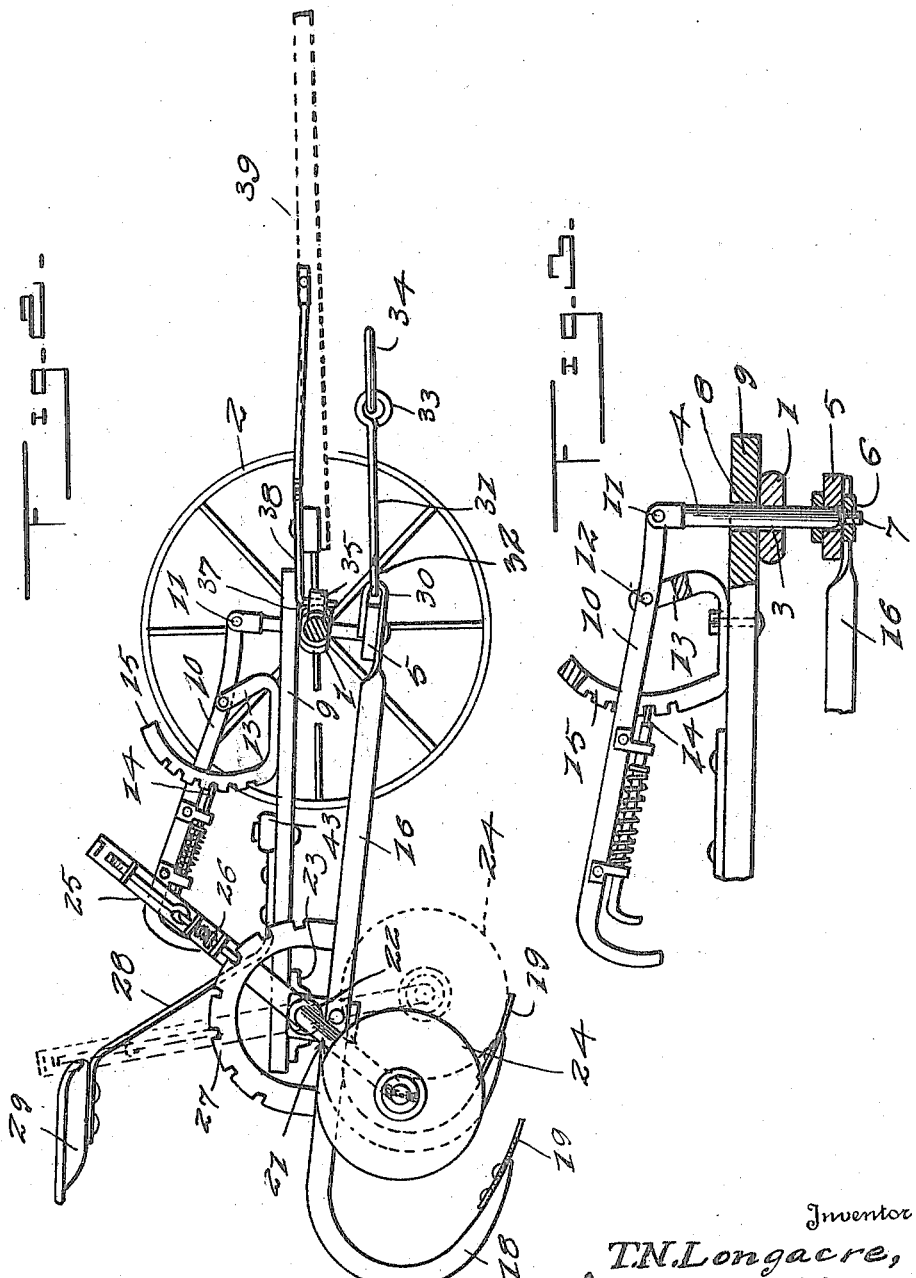

THOMAS N. LONGACRE, OF HASTY, AND CHARLES BALDWIN, OF CADDOA, COLORADO.

CULTIVATOR.

1,264,102.

Specification of Letters Patent. Patented Apr. 23, 1918.

Application filed February 2, 1917. Serial No. 146,088.

*To all whom it may concern:*

Be it known that we, (1) THOMAS N. LONGACRE and (2) CHARLES BALDWIN, (1) a citizen of the United States, (2) a citizen of the United States, residing at (1) Hasty, (2) Caddoa, (1) county of Bent, (2) in the county of Bent, and State of (1) Colorado, (2) Colorado, have invented certain new and useful Improvements in Cultivators; and we do hereby declare the following to be a full, clear, and exact description of the invention, such as will enable others skilled in the art to which it appertains to make and use the same.

This invention relates to cultivators, and the primary object of the invention is to provide a cultivator which is particularly designed for cultivating alfalfa or analogous crops.

Another object of the invention is to provide an alfalfa cultivator structure which includes a supporting structure, to which is adjustably connected a standard carrying bar, to provide an arch axle which is pivotally carried by the supporting structure and has wheels mounted upon its lower spindle ends, which wheels are adapted for engagement with the surface of the ground over which the cultivator is traveling for regulating the depth of insertion of the plow points into the ground.

With the foregoing and other objects in view, this invention consists in such novel features of construction, combination and arrangement of parts as will be hereinafter more fully described, illustrated in the accompanying drawings, and claimed.

In describing the invention in detail reference will be had to the accompanying drawings wherein like characters designate like and corresponding parts throughout the several views and in which:

Figure 1 is a top plan view of the improved alfalfa cultivator.

Fig. 2 is a side elevation showing parts in section.

Fig. 3 is a fragmentary section through the alfalfa cultivator showing the manner of adjustably connecting the standard carrying bar to the supporting structure of the alfalfa cultivator, and Fig. 4 is a detail perspective of one of the alfalfa cultivator shovels and a portion of the standard which carries the shovels.

Referring more particularly to the drawings, 1 designates the front and main supporting axle of the alfalfa cultivator, which has supporting wheels 2 mounted upon its outer spindle end. The central portion of the axle 1 is enlarged and provided with a vertical opening 3 through which a pin 4 extends. The lower end of the pin 4 extends through a bar 5, and the pin is connected to the bar by means of a nut 6 which is mounted upon the reduced screw threaded end 7 of the pin 4. The pin 4 extends upwardly through the opening 3 in which it is slidably mounted through an opening 8 formed in the supporting bar 9 and has a hand lever 10 pivotally connected to its upper end as is shown at 11. The hand lever 10 is pivotally supported at 12 by a standard 13, and it has a dog mechanism 14 of the usual construction carried thereby which coacts with a quadrant 15. The hand lever 10 is provided for moving the pin 4 vertically a limited distance regulating the height of the bar 5.

The bar 5 has a plurality of cultivator shovel carrying standards 16 pivotally connected thereto, which standards extend rearwardly from the bar 5 and through a bar 17. The rear end 18 of the standards 16 are curved downwardly as clearly shown in Figs. 2 and 4 of the drawings, and they have cultivating shovels 19 attached to their lower ends.

The cultivator shovels 19 are narrow and pointed for deep insertion into the ground for thoroughly stirring up and loosening the ground around the roots of alfalfa or the like.

The bar 17 is connected to the horizontal portion 20 of an arch axle 21 by plates 22 and the arch axle 22 is rotatably supported by a suitable bearing 23 which is attached to and depends from the under surface of the rear ends of the bar 9. The axle 21 has disk supporting wheels 24 mounted upon its lower spindle end which wheels are adapted for riding upon the surface of the ground for regulating the depth of insertion of the cultivating plows 19. A hand lever 25 is connected to the arch axle 21 and it has a dog mechanism 26 carried thereby which coacts with a quadrant 27 for holding the axle 21 in various adjusted positions for regulating the elevation of the disk wheels 24.

The bar 9 has a spring standard 28 attached thereto upon the upper end of which is mounted a seat 29 of the usual type employed in agricultural implements. The seat 29 is positioned so that the operator of the machine may conveniently reach both the levers 25 and 10 from the seat for adjusting the position of the bar 5 and consequently the front end of the standard 16 by the operation of the lever 10 and for adjusting the angle of the downwardly extending or leg portion of the arch axle 21, and consequently regulating the elevation of the disk wheels 24 which in turn regulates the depth of insertion of the shovels 19 into the ground.

The bar 5 has a pair of staples 30 connected thereto and extending forwardly therefrom, to which staples are connected rods 31 through the medium of eyes 32 which are formed upon the ends of the rods 31. The rods 31 have eyes 33 formed upon their forward ends which are connected to a ring 34 as clearly shown in Figs. 1 and 2 of the drawings. The ring 34 may be connected through the medium of the usual type of clevis to the draft tree if it is so desired.

The axle 1 has a pair of forward extending ears 35 connected thereto, which ears are provided with vertical openings 36 through which the downwardly angled ends 37 of rods 38 are adapted to extend for connecting a tongue structure 39 to the cultivator, when it is desired to use a tongue in connection with the draft animals for pulling the cultivator. In Fig. 1 of the drawings, the tongue structure is illustrated in dotted lines, and it includes a transversely disposed bracing bar 40 and a pair of angularly disposed bracing bars 41 which extend through the bar 40 and have their rear ends bent downwardly to provide the portions 37. The bracing bars 41 and the rods 38 are formed integral.

A suitable foot rest 43 is attached to the bar 9 forwardly of the seat 29.

In reducing the invention to practice, certain minor features of construction, combination and arrangement of parts may be made without departing from the spirit and scope of the invention as defined in the appended claims.

What is claimed is:

1. In a cultivator structure, the combination, of a front axle, a pin extending vertically and slidably through said axle, a bar connected to the lower end of said pin, a plurality of cultivator shovel carrying standards connected to said bar, a lever connected to said rod for moving said rod vertically and adjusting the elevation of said bar and the front ends of said cultivator shovel carrying standards, a bracing bar attached to said axle and extending rearwardly therefrom, an arch axle rockably supported by said brace bars, supporting wheels mounted upon the ends of said arch axle and adapted for engagement with the ground, means for rocking the arch axle for varying the position of said wheels for regulating the depth of insertion of shovels carried by said standards.

2. In an alfalfa cultivator, a front axle, a supporting bar attached to said axle and extending rearwardly therefrom at right angles to the axle, a cross bar positioned beneath said axle, a rod attached to the center of said cross bar and extending upwardly through said axle and said supporting bar, a plurality of cultivating means having their forward ends attached to said cross bar in spaced relation, a quadrant carried by said supporting bar and having an upstanding arm formed thereon, a lever pivotally connected to said upstanding arm and to the upper end of said rod whereby the elevation of said cross bar may be adjusted with respect to said axle upon pivotal movement of said lever, a pair of clevices carried by said bar, rods loosely connected to said clevices, and a hitch link loosely connected to the forward ends of said rod.

In testimony whereof we affix our signatures in presence of two witnesses.

THOMAS N. LONGACRE.
CHARLES BALDWIN.

Witnesses:
  FRED B. FROSTEL,
  CHARLES M. MARKS.

Copies of this patent may be obtained for five cents each, by addressing the "Commissioner of Patents, Washington, D. C."